(12) United States Patent
Scherzer et al.

(10) Patent No.: US 6,895,258 B1
(45) Date of Patent: May 17, 2005

(54) SPACE DIVISION MULTIPLE ACCESS STRATEGY FOR DATA SERVICE

(75) Inventors: Shimon B. Scherzer, Sunnyvale, CA (US); Piu B. Wong, Monte Sereno, CA (US)

(73) Assignee: Kathrein-Werke KG, Rosenheim (DE)

( * ) Notice: Subject to any disclaimer, the term of this patent is extended or adjusted under 35 U.S.C. 154(b) by 654 days.

(21) Appl. No.: 09/929,866

(22) Filed: Aug. 14, 2001

Related U.S. Application Data

(60) Provisional application No. 60/242,267, filed on Oct. 19, 2000, and provisional application No. 60/225,570, filed on Aug. 14, 2000.

(51) Int. Cl.⁷ .............................................. H04B 1/38
(52) U.S. Cl. .............................. 455/562.1; 455/67.16; 455/60; 370/334
(58) Field of Search ................................. 455/60, 67.16, 455/139, 63.4, 204, 304, 25, 303, 452.1, 452.2, 561, 562.1, 456.1; 370/334, 328, 337, 342, 442; 342/367, 368, 372, 354; 375/148, 150

(56) References Cited

U.S. PATENT DOCUMENTS

| | | | |
|---|---|---|---|
| 5,471,647 A | | 11/1995 | Gerlach et al. |
| 5,634,199 A | | 5/1997 | Gerlach et al. |
| 5,684,836 A | * | 11/1997 | Nagayasu et al. ........... 375/326 |
| 5,930,243 A | * | 7/1999 | Parish et al. ................. 370/334 |
| 6,026,304 A | * | 2/2000 | Hilsenrath et al. ........ 455/456.2 |
| 6,108,565 A | | 8/2000 | Scherzer |
| 6,141,335 A | * | 10/2000 | Kuwahara et al. ........... 370/342 |
| 6,181,955 B1 | * | 1/2001 | Dartois ...................... 455/562.1 |
| 6,192,038 B1 | * | 2/2001 | Wallerius et al. ............ 370/328 |
| 6,229,481 B1 | * | 5/2001 | Katz ............................ 342/367 |
| 6,269,247 B1 | * | 7/2001 | Chiodini ................... 455/456.2 |
| 6,289,005 B1 | * | 9/2001 | Katz ............................ 370/328 |
| 6,320,853 B1 | | 11/2001 | Wong et al. |
| 6,347,234 B1 | | 2/2002 | Scherzer |
| 6,349,094 B1 | * | 2/2002 | Vastano et al. .............. 370/328 |
| 6,415,163 B1 | * | 7/2002 | Keskitalo et al. ......... 455/562.1 |
| 6,615,024 B1 | * | 9/2003 | Boros et al. .............. 455/67.14 |
| 6,643,526 B1 | * | 11/2003 | Katz ............................ 342/359 |
| 6,735,182 B1 | * | 5/2004 | Nishimori et al. ........... 370/294 |
| 6,738,619 B1 | * | 5/2004 | Yabuta et al. ................ 455/423 |
| 6,754,286 B2 | * | 6/2004 | Hottinen et al. ............. 375/299 |
| 6,839,574 B2 | * | 1/2005 | Petrus et al. ............. 455/562.1 |

OTHER PUBLICATIONS

Anderson, Soren, et al. "Adaptive Antennas for GSM and TDMA Systems," IEEE Personal Communications. (Jun. 1999) pp. 74–86.

Wells, M.C. "Increasing the Capacity of GSM Cellular Radio Using Adaptive Antennas," IEE Proc.–Commun., vol. 143, No. 5, (Oct. 1996) pp. 304–310.

U.S. Appl. No. 09/874,930, Wu et al.
U.S. Appl. No. 09/874,932, Wong et al.

* cited by examiner

Primary Examiner—CongVan Tran
(74) Attorney, Agent, or Firm—Fulbright & Jaworski LLP

(57) ABSTRACT

Disclosed are systems and methods which select multiple communication beams for simultaneous use such that potential scatters (e.g. reflectors) are not illuminated by simultaneous transmissions. Preferred embodiments of the present invention provide for maximizing aggregate throughput by continuously selecting the best subscriber station combination to be serviced simultaneously, such as based upon their spatial status and Quality of Service (QOS) metrics. Additionally or alternatively, embodiments of the present invention may facilitate demodulation reference using a system common pilot, training sequence, or other system signal.

50 Claims, 3 Drawing Sheets

SPACE DIVISION MULTIPLE ACCESS STRATEGY FOR DATA SERVICE

CROSS-REFERENCE TO RELATED APPLICATIONS

The present application is related to, and priority is hereby claimed to, copending and commonly assigned U.S. provisional patent applications Ser. No. 60/225,570 entitled "Forward Link SDMA Strategy for Data Service," filed Aug. 14, 2000, and Ser. No. 60/242,267 entitled "Forward Link SDMA Strategy for Data Service," filed Oct. 19, 2000, the disclosures of which are hereby incorporated herein by reference. The present application is also related to copending and commonly assigned U.S. patent applications Ser. No. 09/874,930 entitled "Directed Maximum Ratio Combining and Scheduling of High Data Rate Transmission for Data Networks," filed Jun. 5, 2001, Ser. No. 09/874,932 entitled "Directed Maximum Ratio Combining Methods and Systems for High Data Rate Traffic," filed Jun. 5, 2001, Ser. No. 09/229,482 entitled "Practical Space-Time Radio Method for CDMA Communication Capacity Enhancement," filed Jan. 13, 1999, which is a continuation in part of Ser. No. 09/929,638 entitled "Practical Space-Time Radio Method for CDMA Communication Capacity Enhancement," filed Sep. 15, 1997 and now issued as U.S. Pat. No. 6,108,565, and Ser. No. 09/672,175 entitled "Methods of Phase Recovery in Cellular Communication Systems," filed Sep. 27, 2000, the disclosure of each of which is hereby incorporated herein by reference.

TECHNICAL FIELD OF THE INVENTION

The invention relates generally to wireless communications and, more particularly, to the use of space division multiple access techniques to provide improved data capacity.

BACKGROUND OF THE INVENTION

Wireless radio communications systems enable many mobile stations or other remote subscriber stations to connect to networks, such as land-based wire-line telephone systems and/or digital information services, for information communication. For example, conventional wireless air-interfaces, such as Frequency Division Multiple Access (FDMA), Time Division Multiple Access (TDMA), and Code Division Multiple Access (CDMA), provide for controlled access to communication bandwidth by remote subscribers.

In wireless communications that are confined to a given space, throughput is generally considered to be bounded by Shannon's theorem, i.e., the maximum transmission rate in bits per second is given by $Wlog_2(1+SN)$, where $W$ is the bandwidth and $SN$ is the signal-to-noise ratio. For example, high data rate transmission (in given channel bandwidth) limits spreading and orthogonal coding such that the higher the data rate the less spreading is possible and, accordingly, less orthogonal codes are available. When Wideband CDMA (W-CDMA) or cdma2000 reach their highest data rate, very little spreading is used, and a small number of orthogonal channels are available. Similarly, General Packet Radio Services (GPRS) and Enhanced Data GSM Environment (EDGE) are good examples of high data rate transmission that is currently limited by the Shannon's theorem bounds.

The wireless communication industry, working with high order modulation and coding techniques, such as those implemented in the W-CDMA, GPRS, and EDGE air interfaces mentioned above, has gotten very close to the Shannon's theorem bounds. Accordingly, it is expected that significant increases in throughput are unlikely to be achieved by further manipulation of such techniques with respect to communications confined to a given space alone. However, increases in wireless capacity may be provided by segregating transmissions to different confined spaces (spatial segregation).

Due to spreading and orthogonal codes in CDMA systems (that gives the interference characteristics of random noise), it is possible to achieve some increase in capacity using spatial segregation associated with fixed sectorization, i.e., dividing the cell into multiple sectors to reduce interference level. However, spatial segregation, such as that associated with fixed sectorization, alone is insufficient to provide maximum increased capacity because of the unpredictable nature of wave propagation. Specifically, the scattering of radiated signals produces multipath conditions that can disrupt communications even in systems employing spatial segregation.

Spatial Division Multiple Access (SDMA) is a way to increase system throughput by segregating transmission space. Specifically, SDMA allows for multiple transmissions, separated by antenna beams (as opposed to frequency, time, or code), to be simultaneously supported. Examples of SDMA methods employing adaptive antenna arrays are described in U.S. Pat. Nos. 5,471,647 and 5,634,199 to Gerlach et al.; an article by M. C. Wells, entitled: "Increasing the capacity of GSM cellular radio using adaptive antennas", *IKE (UK) Proc. on Comm.* Vol. 143, No. 5, October 1996, pp. 304–310; and an article by S. Anderson, B. Hagerman, H. Dam, U. Forssen, J. Karlsson, F. Kronestedt, S. Mazur and K Molinar, entitled: "Adaptive Antennas for GSM and TDMA Systems", *IEEE Personal Communications*, June 1999, pp. 74–86, all of which are incorporated by reference.

Unfortunately, forward link beam forming as used in providing SDMA for mobile applications presents multiple challenges. For example, when the reverse link frequency differs from the forward link frequency, it may be difficult to accurately estimate the forward link direction and angle spread based on reverse link metrics. Signal fading in mobile applications causes the transmission channels to change rapidly, thereby limiting the efficiency of "feedback type" forward link beam forming estimation. This problem persists for Time Division Duplex (TDD) type systems. Accordingly, implementation of SDMA in wireless communication systems to provide improved capacity has been limited.

Moreover, it has been discovered in arriving at the present invention that, when beam shapes are relied upon to provide isolation among different transmissions, multipath can deteriorate the isolation and thereby introduce intra-cell interference. This intra-cell interference may disrupt the transmission, hence diminishing or eliminating the advantage of beam forming all together.

For example, in a typical multipath rich environment, the beam shapes used in providing SDMA cannot guarantee sufficient inter-beam interference rejection as the signals associated with one subscriber's station may be reflected from structures and penetrate areas that are assumed to be out of reach of that subscriber's beam. Furthermore, in some situations, non-line of sight scattering may actually enable the connection with a particular subscriber. In such a situation the beam-width associated with such a non-line of sight link may not be reduced as much as for line of sight conditions, resulting in increased multipath intra-cell interference.

A need therefore exists in the art for systems and methods which provide segregation of an area in which communications are provided to thereby provide increased capacity. A further need exists in the art for such systems and methods to segregate the space based on multipath conditions to thereby provide adaptive segregation.

BRIEF SUMMARY OF THE INVENTION

These and other objects, features and technical advantages are achieved by systems and methods which select multiple communication beams for simultaneous use such that potential scatters (e.g. reflectors) are not illuminated by simultaneous transmissions. For example, communication systems operating according to the present invention may determine forward link scattering boundaries for planning multiple forward link beams, each preferably associated with a spatially separated subscriber station, so that one such beam does not illuminate scatters that may result in disruption of a transmission of another forward link beam. Preferred embodiments of the present invention provide for maximizing aggregate throughput by continuously selecting the best subscriber station combination to be serviced simultaneously, such as based upon their spatial status and Quality of Service (QOS) metrics. Additionally or alternatively, embodiments of the present invention may facilitate demodulation reference using a system common pilot, training sequence, or other system signal.

According to preferred embodiments of the invention, increased wireless communication throughput, such as in the forward link of a cellular communication system, is provided using Spatial Division Multiple Access (SDMA). SDMA as utilized according to preferred embodiments of the present invention use spatial separation to achieve simultaneous transmissions of different data streams over a same communication system channel (e.g., a frequency, code, and/or time channel) to multiple subscriber systems with an acceptable QOS. The spatial separation associated with preferred embodiment implementations of SDMA can be provided using beam forming techniques, where the beam formed antenna patterns provide for sufficient isolation between different data streams.

The use of spatial separation or SDMA techniques of the present invention may be applied to a variety of air-interfaces. For example, the present invention may be applied to Time Division Multiplex (TDM) air-interfaces including those of Global System for Mobiles (GSM), EDGE, Electronic Industries Association Interim Standard 136 (IS-136), International Telecommunication Union cdma2000, W-CDMA, and Qualcomm Corporation's High Data Rate (HDR) (1xEV). Preferably, systems adapted according to the present invention provide the ability to delay data transmission to and/or from subscriber stations, within a given limit, to create orthogonality by space and time, as is desirable in providing simultaneous transmissions.

In operation according to a preferred embodiment of the present invention, subscriber station spatial information is used in determining compatible subscriber stations for simultaneous communication. Such subscriber station spatial information may be provided by estimating direction of transmission with respect to multiple subscriber stations, such as through reference to receive signal vectors. Multiple simultaneous antenna beams are preferably selected to avoid multipath interference in the SDMA implementation. Preferably, selection of multiple simultaneous antenna beams is made according to the present invention by estimating individual scattering zone boundaries. The selection of multiple simultaneous antenna beams may be made in advance of actual data transmission, such as by using a probing signal.

In systems using a common reference signal, e.g., an omni-directional transmitted pilot reference signal, to demodulate an SDMA beam formed data stream of the present invention, preferred embodiments may provide beam configuration, e.g., beam-width, adjustment to result in a proper phase match between the reference signal and data stream. Alternatively, a demodulation reference may be provided or reconstructed using portions of the received signal, such as data or a Medium Access Control (MAC) signal that has low order modulation.

Transmission scheduling is preferably implemented to maximize throughput, such as by weighting scheduling of subscriber stations to favor transmissions that can be accomplished in the presence of other transmissions. Throughput may be increased according to the present invention by maximizing the number of simultaneous transmissions at any given instance while maintaining the level of interference to other cells in the network (fixed Effective Radiated Power (ERP)).

Accordingly, it should be appreciated that a technical advantage of the present invention is that segregation of a communication service area is provided to result increased communication capacity. A further technical advantage of the present invention is provided in that segregation of a service area is based on multipath conditions to ensure isolation between simultaneous communications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
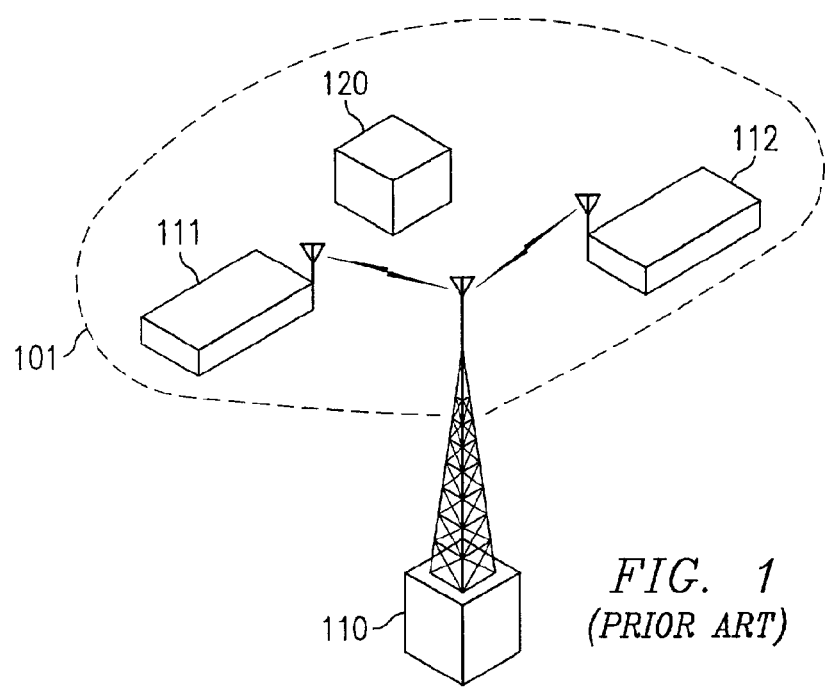
FIG. 1 shows operation of a prior art base transceiver station.

Directing attention to FIG. 1, a wireless system in which multiple subscriber stations are in communication with a wireless access point is shown. Specifically, data terminals 111 and 112, such as may be cellular wireless handsets, are shown to be in wireless communication with access point 110, such as may be a cellular Base Transceiver Station (BTS). Preferably access point 110 is coupled to a network (not shown), such as a cellular telephony network, a personal communications services network, or even the Internet, and provides information communication between the network and various subscriber stations, such as data terminals 111 and 112. In providing communication to multiple subscriber stations, access point 110 may illuminate an area associated with the multiple subscriber stations, such as a cell or a sector of a cell, with a radiated signal, such as that of sector beam 101 of FIG. 1.

However, the use of such a broadcast approach to communications results in excess radiated energy experienced by the communication devices, e.g., intra-cell interference, and therefore results in a reduction in capacity and/or quality of service. Moreover, the topology and/or morphology of the area, such as a sector or a cell, may include elements resulting in multipath communication conditions, such as scatterer 120, such as may be a building, a sign, a mountain, or other object which results in non-homogeneous propagation conditions. Such multipath conditions may not only result in degraded signal quality at an intended subscriber system, but may also further aggravate intra-cell interference.

As an example, systems implementing the HDR (High Data Rate) air-interface, a proprietary air-interface of Qualcomm Corporation, provide for high data rate in the forward link using Time Division Multiplex (TDM) broadcasts, with typical Code Division Multiple Access (CDMA) related data rate broadcasts in the reverse link. The basic principles of high data rate implemented by HDR (in the forward link) are the use of time division multiplex transmission where priority of service is given to subscribers experiencing better channel conditions (the forward link channel can accommodate a higher data rate), thus allowing for "non-even" service quality (latency ratio).

In operation, HDR systems analyze channel conditions for the multiple subscribers within a sector, selects a subscriber system for which high data rate transmission can be supported with the current channel conditions, and broadcasts data associated with the selected subscriber system in a next time slot. Channel quality estimation is provided in HDR by the individual subscriber stations determining the ratio of the common pilot power of the cell in which the subscriber station is located to the common pilot power of other cells in the network. This channel quality estimation is highly dependent upon the total amount of energy present and the effects of multipath experienced.

Current HDR implementations do not incorporate Adaptive Antenna Array (AAA) technology. Accordingly, spatial segregation beyond simple sectorization is not presently possible with HDR. Moreover, in order to provide a highest possible data rate, no code multiplexing is provided in the forward link. Accordingly, a single TDM forward link data stream is available for all subscriber systems in a particular area, such as a sector.

Forward link throughput capability may be enhanced in such systems according to the present invention by providing simultaneous, spatially multiplexed (such as using SDMA), transmissions streams to various subscriber systems of a particular area, such as a cell or a sector. Implementing SDMA according to the present invention preferably reduces the amount of radiated energy at points within the area and/or avoids or minimizes the effects of multipath conditions and, thus, allows for increased capacity and/or signal quality.

Figure 2:
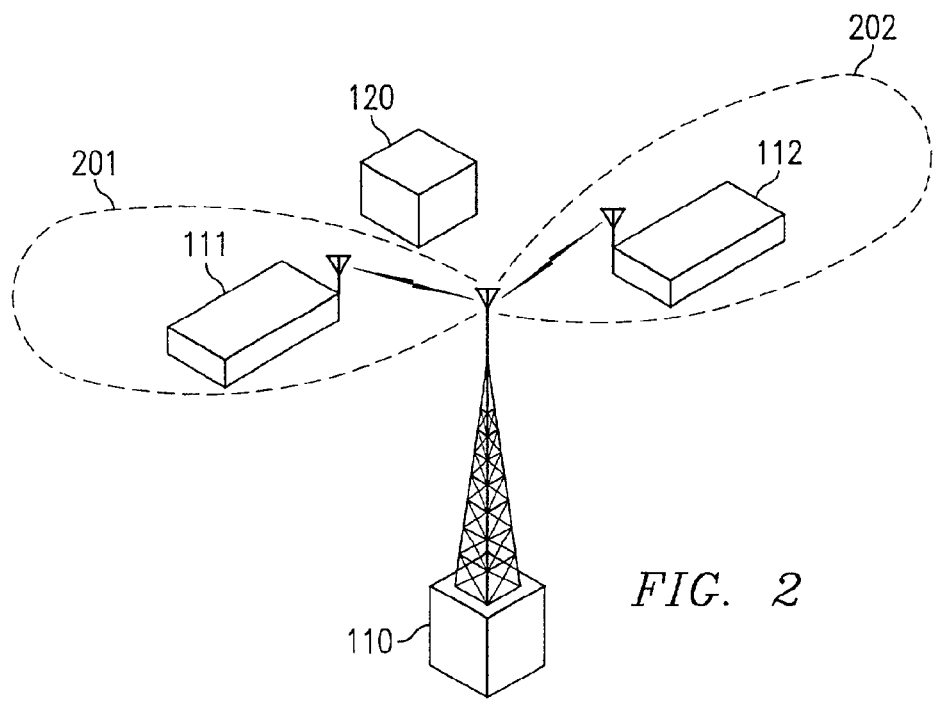
FIG. 2 shows operation of a base transceiver station adapted according to the present invention to provide spatial diversity.

Directing attention to FIG. 2, a preferred embodiment implementation wherein spatial segregation of communications associated with data terminals 111 and 112 is provided using multiple simultaneous adaptive beams 201 and 202, respectively. As can be appreciated from the illustration of FIG. 2, energy associated with communication to data terminal 111 is substantially confined within the area of adaptive beam 201. Similarly, energy associated with communication to data terminal 112 is substantially confined within the area of adaptive beam 202. Moreover, multipath effects, such as those associated with the presence of scatter 120, are avoided or minimized by adaptive beams 201 and 202 substantially eliminating scatterer 120 from their respective radiation patterns.

Accordingly, channel quality associated with the communications of each of data terminals 111 and 112 is improved. Using SDMA according to the present invention, data throughput is multiplied while the interference energy level to other subscriber systems, sectors, and/or cells in the network is maintained or reduced.

It should be appreciated that adaptive beams formed according to the present invention need not exclude or substantially exclude scatters to achieve the advantages disclosed herein. Instead, beam forming for SDMA according to preferred embodiments of the present invention is provided with reference to scattering zones or the effects of scatters such that adaptive beam configurations are selected for simultaneous use which result in a desired level of signal isolation therebetween.

Preferred embodiment forward link SDMA algorithms of the present invention maximize forward link throughput by maximizing the average number of simultaneous forward link data streams, while minimizing the intra-cell interference. Algorithms operating according to preferred embodiments of the invention determine forward link scattering boundaries such that potential scatterers (reflectors) are not illuminated resulting in unacceptable multipath effects. After such scattering boundaries are determined, a system operating according to the present invention may plan multiple forward link beams so that one beam does not illuminate scatterers that may disrupt another transmission. Preferably, aggregate throughput is maximized according to embodiments of the present invention by continuously selecting the best subscriber system combination to be served based on the spatial status and QOS of the subscriber systems. For example, combinations of subscriber systems to be served simultaneously may be selected not only based upon a maximum number of subscriber systems which may be served during a same time, but also as a function of the data rate a communication channel associated with each such subscriber system may accommodate.

Accordingly, transmission scheduling is preferably utilized according to the present invention to improve forward link performance. According to preferred embodiment transmission scheduling implementations, service may be scheduled based on channel loss conditions and/or based on spatial conditions. For example, if a subscriber system is relatively isolated in angle, it may be more frequently serviced, thereby increasing system throughput.

Preferably, Data Rate Control (DRC) is provided with respect to simultaneous beams of the present invention on a continuous basis, and at a sufficient rate, so as to accommodate Rayleigh fading. For example, subscriber data terminals may provide forward channel condition information, similar to that of Qualcomm's HDR systems, to a BTS operating according to the present invention to facilitate DRC at a desired rate. The DRC may be estimated based on common pilot Carrier to Interference (C/I) in systems such as the aforementioned HDR systems. Additionally or alternatively, a training sequence may be readily used to estimate DRC, such as in GSM or IS-136 systems since their training sequences are time multiplexed into the data stream as the pilot in HDR.

Preferred embodiments of the present invention facilitate demodulation of transmitted signals while providing multiple simultaneous spatially diverse antenna beams as described above. Various embodiments of the invention are adapted for providing signal demodulation when implementing SDMA through reference to a system common pilot, training sequence, or a signal stream present in the communication protocol. Accordingly, pilot/data phase mismatch is preferably estimated for beam width control. For example, a subscriber station may estimate a phase mismatch between a traffic signal and a pilot signal, used in demodulating the traffic signal, and provide information with respect thereto to a BTS in communication therewith in order to provide selection of a beam width providing a minimized or otherwise acceptable phase correspondence between the traffic and pilot signals.

An automatic repeat request (ARQ) mechanism is preferably implemented according to the present invention to deal with erroneous data. Additionally or alternatively, frame error rate statistic reports, such as from subscriber systems, may be utilized to provide a slow changing indication of service quality ("set-point" in CDMA systems) for a given beam width, such as a forward link beam used with respect to a subscriber system's traffic signal.

In operation according to a preferred embodiment of the present invention, a forward link beam forming process utilizes Array Response Vectors (ARV) from subscriber systems as measured on a reverse link, such as by integrating each subscriber system's reverse link dedicated pilot for a specific integration interval. The measured ARVs are preferably used in estimating an Angle of Arrival (AOA), normally associated with position, for each connected subscriber system. Additionally, the measured ARVs are preferably used in determining a fading rate profile, such as may be associated with movement speed, associated with each connected subscriber system.

AOA and fading rate information determined according to the present invention may be utilized in determining subscriber systems which are compatible for simultaneous transmission and/or for selecting antenna beams, or the characteristics thereof, for implementing SDMA. In particular systems, such as the above mentioned HDR systems, the fading rate value may further be used to modulate the reverse link power control (RPC) symbol amplitude to allow a better pilot/RPC phase estimate and more robust RPC operation.

In determining angular boundaries for simultaneous beam forming with minimum intra-cell interference according to preferred embodiments of the present invention, direction and width beam parameters with respect to beams suitable for providing communications with the various subscriber systems are preferably determined. For example, forward link direction may be estimated using the reverse link by measuring an array response vector and finding the highest correlation point on the array manifold. By collecting sufficient samples of the array respond vector and building an angle of arrival histogram, the forward link direction may be estimated as the "peak" of the arrival histogram. Systems and methods for determining beam direction parameters using angle of arrival estimation are shown and described in detail in the above referenced commonly assigned patent application entitled "Practical Space-Time Radio Method for CDMA Communication Capacity Enhancement."

A challenge is presented, however, in determining beam width which may be used with respect to a subscriber system such that intra-cell interference will be reduced to a negligible level. Specifically, having determined the position of a subscriber system, such as using the above described angle of arrival estimation, selection of a beam width for use with the subscriber system which results in no errors, or only an acceptable level of errors, from intra-cell interference associated with the use of this particular beam configuration is difficult. Determining a beam width which results in negligible intra-cell interference is further complicated in systems providing signal demodulation through reference to a system common pilot or similar reference signal. Specifically, use of a narrow beam for traffic signals while a wide beam is used to provide a common pilot for multiple subscriber systems can result in demodulation errors as a result of phase mismatch between the traffic signal and reference signal.

Preferred embodiments of the present invention determine a beam width which is suited to the subscriber system's environment through the use of a "probing signal." A short packet of data transmitted from time to time may provide the probing signal of the present invention. For example, the reverse link power control (RPC) symbol which is periodically transmitted in HDR systems may be utilized as a probing signal of the present invention. The use of RPC symbols as a probing signal according to the present invention is discussed in further detail below.

In determining beam width parameters, a channel training sequence (or pilot) is preferably transmitted on a wide beam, such as a sector or omni-directional beam, while the probing signal is transmitted on a narrow beam directed at the subscriber system. The narrow beam configuration, e.g., beam width, may be varied over time to analyze the scattering zone associated with the subscriber unit's environment. Accordingly, electrical phase difference between the training sequence and the probing signal may be used to estimate the beam width which illuminates all effective scatterers.

According to preferred embodiments of the invention, low order modulation, such as Binary Phase Shift Keying (BPSK), of the probing signal is used to facilitate easy estimation of the phase difference. If the probing signal contains a data packet, such as with the aforementioned RPC symbol, an error detection mechanism is preferably used to determine the polarity. The use of such a technique allows for a minor subscriber terminal change to be utilized in implementing the present invention without requiring substantial alteration to an existing air interface.

Figure 3:
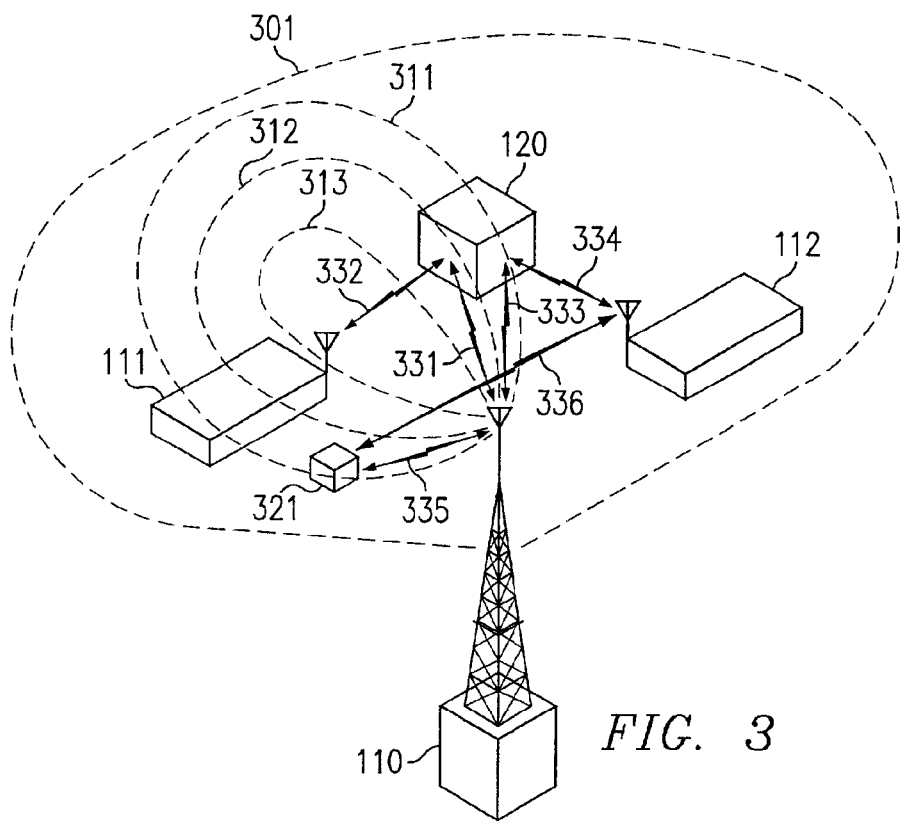
FIG. 3 shows operation of a base transceiver station in determining a scattering zone according to a preferred embodiment of the present invention.

Directing attention to FIG. 3, a preferred embodiment implementation is illustrated wherein a training sequence or pilot is transmitted in sector beam 301. In the embodiment of FIG. 3, the probing signal is preferably transmitted in narrow beams 311–313, such as beginning with most narrow beam 313 at a first time, proceeding to wider beam 312 at a second time, and proceeding to still wider beam 313 at a third time. The phase difference between the training sequence transmitted in sector beam 301 and the probing signal transmitted in each of narrow beams 311–313 is preferably determined. From this phase difference information, the beam width which illuminates all effective scatterers may be determined.

It has been discovered that the phase difference between a probing signal transmitted through a narrow beam and a pilot transmitted through a sector beam, or other wider beam, is due to different scatterers covered by the two beams. For example, sector beam 301 covers more scatterers, e.g., scatterers 120 and 321, than does narrow beam 313 and, therefore, a relatively large phase difference would be expected between the probing signal transmitted in narrow beam 313 and a pilot signal transmitted in sector beam 301.

To eliminate the phase difference described above, the probing signal beam width is preferably adjusted to encapsulate the "effective scatterers." For example, scatterer 120 may be disposed in an orientation and/or provide a surface such that signals transmitted from access point 110 are provided a multipath reflection with respect to data terminal 111, e.g., the reflective path indicated by propagation vectors 331 and 332. It should be appreciated that scatterer 321, although disposed to be encompassed by sector beam 301, may not result in appreciable reflection of signals, e.g., scatterer 321 may not be disposed in an orientation and/or provide a surface such that signals transmitted from access point 110 are provided a multipath reflection with respect to data terminal 111. Accordingly, scatterer 321 may not present an "effective scatterer" according to this preferred embodiment implementation.

When a relatively large phase difference is measured with respect to transmission of the probing signal in narrow beam 313, the probing signal may be transmitted in a wider beam, such as narrow beam 311. As shown in FIG. 3, narrow beam 311 substantially encompasses effective scatterer 120. Accordingly, it is expected that the phase error between the probing signal transmitted in narrow beam 311 and the pilot transmitted in sector beam 301 will be appreciably smaller than the phase error between the probing signal transmitted in narrow beam 313 and the pilot transmitted in sector beam 301.

Although providing an acceptable phase match between the probing signal and the pilot signal, narrow beam 311 may not provide the most narrow beam configuration resulting in an acceptable phase match. For example, narrow beam 312, which is more narrow than narrow beam 311, also illuminates effective scatterer 120. Accordingly, it may also be expected that the phase error between the probing signal transmitted in narrow beam 312 and the pilot transmitted in sector beam 301 will be appreciably smaller than the phase error between the probing signal transmitted in narrow beam 313 and the pilot transmitted in sector beam 301. Moreover, the use of narrow beam 312 may result in a reduction of intra-cell interference, e.g., associated with the reflective path indicated by propagation vectors 333 and 334 and/or 335 and 336. Accordingly, operation of the preferred embodiment may step through less and less narrow antenna beam configurations, such as beginning with narrow beam 313 and stepping to narrow beam 312 before stepping to narrow beam 313.

When the phase difference is reduced to the point that its value is smaller than the phase error that can cause demodulation error, the corresponding beam width can be identified as a beam configuration suitable for providing a traffic link with the subscriber station according to the present invention. Moreover, this beam width can be used according to the present invention to identify the "scattering boundaries" associated with a particular subscriber station.

It has been discovered that the scatterers that are effective enough to cause phase differences are generally the same scatterers that will provide interfering multipath in case of being illuminated by another transmission. For example, narrow beam 312 of FIG. 3 sets forth a scattering boundary associated with data terminal 111. If a narrow beam utilized in simultaneously providing a traffic signal to data terminal 112 overlaps the scattering boundary identified by narrow beam 312, it can be expected that interfering multipath signals, e.g., associated with propagation vectors 333 and 334, will be experienced by data terminal 111. Accordingly, preferred embodiments of the present invention operate to identify particular subscriber systems which are compatible for simultaneous communication using the narrow beams as described above. A preferred embodiment for identifying compatible subscriber systems is discussed below with respect to a compatibility probing technique.

A practical example of implementation of the above described preferred embodiment beam width determination can be demonstrated in HDR. The HDR forward link contains a reverse link power control (RPC) symbol which may be utilized as a "natural" probing signal according to the present invention. This HDR RPC bit is BPSK modulated, i.e., its value can be either +1 or −1, and is transmitted every time slot (1.66 msec). In operation according to HDR protocols, the subscriber system must determine the RPC value to maintain power control. Hence, resolving phase ambiguity (±80 degrees) is preferably facilitated by adjusting the probing signal beam, so that reverse link power control is properly functioning. A next step according to this implementation is preferably to estimate the residual phase difference between the RPC and the common pilot. Preferably, the RPC carrying beam width is adjusted to the required phase difference, e.g., a phase difference smaller than the phase error that can cause demodulation error, as described above.

Preferably, a beam width control loop is implemented to facilitate the above-described process. According to preferred embodiments, a beam width control loop of the present invention includes both "slow" and "fast" loops. For example, a slow beam width control loop of the present invention may be implemented by assuring correct demodulation of the probing signal. A determination with respect to correct demodulation of the probing signal generally requires some integration and, therefore, the response time of such an implementation is expected to be relatively slow. A fast beam width control loop of the present invention may use direct measurement of the phase variance between the pilot and the probing signal. For example, since the HDR RPC is sent every 10.66 msec, direct measurement of the phase variance provides for the beam width being updated at this rate, thereby accommodating a level of subscriber system mobility beyond that of slow loop beam width control.

It should be appreciated that the use of a beam width control loop of the present invention is very effective in HDR systems since there is no power control on forward link. Since forward link data rate is determined solely by the subscriber systems in HDR, data errors are generally caused by data/pilot phase mismatch. Thus, data error becomes a good metric for outer loop beam width control.

Accordingly, fast beam width control may use acknowledgement (ACK)/negative acknowledgment (NACK) signaling from subscriber systems in order to facilitate beam width selection. For example, NACK signals may be utilized to indicate the need to increase the beam width, whereas ACK signals may be utilized to indicate the possibility that the beam width may be reduced. Accordingly, in a preferred embodiment implementation, the slow loop may be implemented based on error statistics while the fast loop may use each ACK or NACK that is transmitted after each frame reception.

Beam width increase/decrease indication may be implemented in a manner similar to that of power control symbol transmission discussed above. According to a preferred embodiment, where HDR systems are utilized, a subscriber system preferably uses the HDR Reverse Link Rate Indicator (RRI) when no other data is being transmitted on reverse link. For example, maximizing data throughput in reverse link may utilize implementation of a TDM scheduling process, such as shown and described in the above referenced patent applications entitled "Directed Maximum Ratio Combining and Scheduling of High Data Rate Transmission for Data Networks" and "Directed Maximum Ratio Combining Methods and Systems for High Data Rate Traffic," may provide a reverse link transmission duty cycle which is relatively low. Accordingly, the RRI in such systems may be used for beam width beam control much of the time.

Figure 4:
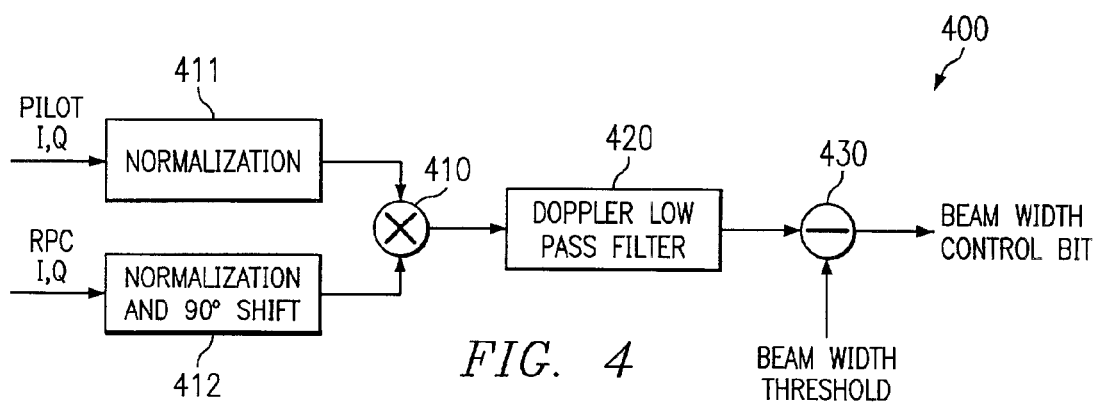
FIG. 4 shows preferred embodiment beam width determination circuitry of the present invention.

Additionally or alternatively, phase mismatch may be measured directly by a subscriber system, such as by using the preferred embodiment beam control bit determination circuitry of FIG. 4. Beam control bit determination circuitry 400 of FIG. 4 preferably provides normalization of the pilot and probing signal for phase mismatch determination. Accordingly, the pilot signal is provided to normalization block 411 and the probing signal is provided to normalization block 412. Normalization block 412 of the preferred embodiment provides a phase shift to the pilot signal, in addition to providing the aforementioned normalization, in order to prepare the received probing signal for phase mismatch comparison to the pilot signal. Specifically, according to the illustrated embodiment, the RPC, which is a BPSK modulated signal, is provided with a 90° phase shift corresponding to the modulated scheme utilized therewith. Thereafter, the normalized pilot and probing signals are provided to multiplier 410 of the preferred embodiment for determining a phase mismatch value.

It should be appreciated that, since preferred embodiment data signals are phase modulated (BPSK, MSK, QPSK, etc.), the phase mismatch values are vectors with size that is equal to the modulation order. For example, if the data is QPSK modulated, the phase vector will be (phase-mismatch, phase-mismatch +90, phase-mismatch +180, phase mismatch +270).

The phase mismatch values output from multiplier 410 are preferably filtered to minimize the impact of anomalous instantaneous phase mismatch results. The preferred embodiment uses filter 420, such as may be a Doppler low pass filter, to filter the output of multiplier 410.

It should be appreciated that the preferred embodiment beam control bit determination circuitry of FIG. 4 does not merely provide determination of phase mismatch, but further operates to provide beam width control signaling. Specifically, beam control bit determination circuitry 400 generates feedback signaling that is very similar in characteristics to common power control methods, e.g., "I" may signal that the beam width should be increased and "0" may signal that the beam width should be reduced. Accordingly, the illustrated embodiment beam control bit determination circuitry provides the filtered phase mismatch values output from filter 420 to circuitry for translating the phase mismatch values into an appropriate control bit.

A beam width threshold value is preferably utilized to adjust or scale the calculated phase mismatch values to a corresponding beam width control signal. The beam width threshold value is preferably established as a phase mismatch value at which signal demodulation may be accomplished without error, or with an acceptable level of errors. Accordingly, the illustrated embodiment provides the calculated phase mismatch value and the beam width threshold value to subtractor 430. If the output of subtractor 430 is greater than 0 (i.e., the calculated phase mismatch is greater than the phase mismatch of the beam width threshold) a beam control bit value of "I" is preferably output. However, if the output of subtractor 430 is less than or equal to 0 (i.e., the calculated phase mismatch is less than or equal to the phase mismatch of the beam width threshold) a beam control bit value of "0" is preferably output.

As mentioned above, the reverse link power control (RPC) symbol which is periodically transmitted in HDR systems may be utilized as a probing signal according to embodiments of the present invention. The use of RPC symbols, or other native symbols for that matter, as probing signals of the present invention is dependent upon the accuracy to which phase mismatch (e.g., pilot to RPC symbol) can be determined, such as using the preferred embodiment beam control bit determination circuitry of FIG. 4. To provide reliable beam width selection according to the present invention, phase mismatch is preferably determined with accuracy that is better than ¼ of the phase modulation error boundaries. According to this preferred embodiment, for BPSK modulated symbols phase mismatch should be determined to better than 90/4 degrees, for QPSK modulated symbols phase mismatch should be determinable to better than 45/4 degrees, for 8PSK modulated symbols phase mismatch should be determined to better than 22.5/4 degrees, etcetera.

It should be appreciated that the HDR RPC is modulated using BPSK. Accordingly, it may be assumed that the RPC is designed to provide for standard variation that is less than 45 degrees (better than 90% probability for correct decision).

To achieve the phase mismatch estimate for QPSK (45/4 degrees) according to the preferred embodiment, simulation has suggested that 16 consecutive slots would preferably be integrated. To achieve the phase mismatch estimate for 8PSK (22.5/4 degrees) according to the preferred embodiment, simulation has suggested that 64 slots would preferably be integrated.

According to preferred embodiments of the present invention, the RPC symbol will be transmitted through narrow beams with average gain G. Accordingly, the RPC C/I is generally improved by factor of G relative to standard HDR design. This gain may allow for a reduction of integration time by factor of G. For example, if the average gain (G) is 6 dB, integration time can be reduced by a factor of 4. Hence, for QPSK the number of slots needed to determine the pilot/RPC phase mismatch would decrease to 4 and, similarly, for 8PSK the number of slots needed to determine the pilot/RPC phase mismatch would decrease to 16. It should be appreciated that accuracy of determination is a goal of the preferred embodiments to facilitate the transmission of different modulations in carrying subscriber payload. Accordingly, as modulation becomes more complex, RPC integration is preferably longer according to preferred embodiments of the invention.

It should be appreciated that, as discussed below with respect to the use of a common pilot for coherent demodulation, some beams may have increased power RPC for demodulation purposes. This increased power could nullify the average gain (G) factor discussed above, resulting in no or little reduction in the above described integration times. However, assuming most subscriber systems are slow moving, and systems operating according to the present invention are able to determine the subscriber system's Doppler rate by evaluating the reverse link ARV and/or other information, the RPC power can be increased by a factor (X) for the few subscribers that are moving relatively fast at the observed instance. This power increase can compensate for higher subscriber system speeds.

For example, let the number of subscriber systems be N, the desired integration time reduction factor be Y, and the relative portion of high Rayleigh fading rate subscriber systems be P. The subscriber systems having a high Rayleigh fading rate (P) power is multiplied by the RPC power increase factor (X) to allow a reduction in integration time (Y). The relationship of these parameters may be written as shown below.

In order to illustrate the above discussed concepts, suppose 10% of subscriber systems (P=0.1) are experiencing a 100 Hz Doppler rate. Suppose further that the average gain provided by the narrow antenna beams of the present invention is 6 dB (G=4), the desired integration time $$\frac{X}{N(1-P)/G + P \cdot N \cdot X/G} = \frac{X \cdot G}{N(1-P) + N \cdot P \cdot X} = Y/N$$

$$X = \frac{(1-P)Y}{G - P \cdot Y}$$

reduction factor is 8 (Y=8), and the power increase factor associated with the subscriber systems experiencing the 100 Hz Doppler rate is 2.25 (X=2.25). It should be appreciated that using forward link beam forming with average gain of 6 dB saves approximately 75% of the power needed for power control. Some portion of this power savings may be used according to the present invention to "bump-up" the RPC signal for selected subscriber systems, e.g., those having the high Doppler rate. In the above example, for Y=8, the total saved RPC power is ¾*0.9+1.75/4*0.1=~72%.

The above analysis clearly shows that RPC can be used for scattering zone determinations according to the present invention, such as where the subscriber speed is limited to cause Doppler rates of approximately 100 Hz for QPSK and 32 Hz for 8PSK. Moreover, the savings in RPC power shown above may be utilized with respect to an alternative embodiment wherein signals, such as the HDR RPC, are used for demodulation of a traffic signal as an alternative to the use of a dedicated pilot, as discussed below.

In normal operation of HDR systems, subscriber systems may be continuously connected to multiple system sectors (sectors of different cells and/or other sectors of the same cell). The subscriber system signals which cell is to serve it, i.e., the sector with the highest power as received by the subscriber system, by covering its reverse link MAC message with a specific Walsh function (one out of eight possible for this purpose). This function provides for macro-diversity, similar to soft handoff in other CDMA systems. It should be appreciated that the macro-diversity of the HDR systems may be utilized to provide more robustness to the SDMA implementations of the present invention as well. For example, a subscriber system may select the serving sector according to minimum pilot/RPC phase mismatch, in the alternative to, or in addition to, selection of a serving sector based upon received power levels. Since the probability of having at least one out of several possible sectors with an acceptable or desirable pilot/RPC phase match is higher than finding "one out of one," the probability of a result with a narrower average forward link beam increases as the "active set" increases.

Preferred embodiments for identifying narrow beam configurations suitable for providing an acceptable phase match and/or which identify subscriber system scattering boundaries have been described above. However, as previously mentioned, such narrow beams may illuminate effective scatters and result in intra-cell interference being experienced with respect to another subscriber system. Preferred embodiment techniques for identifying particular subscriber units which are compatible for simultaneous communication using the identified narrow beam configurations are described below.

According to a preferred embodiment, the decision as to which beams may be simultaneously operated without intra-cell interference can be made ahead of actual data transmission. For example, rather than initially using a narrow beam configuration for transmission of a data signal, a probing signal may first be used. In many systems MAC layer signaling could be used, such as an RPC signal in HDR systems.

Accordingly, channel evaluation with respect to the subscriber systems may be accomplished according to a preferred embodiment of the present invention using a "probing" technique. According to a preferred embodiment, code multiplexed signals are distributed by beam forming to all connected subscribers from time to time (the rate is preferably sufficiently low so as not to jeopardize cell's capacity). For example, a code multiplexed signal may be provided in a narrow beam associated with a particular subscriber unit at a first time and, later, a code multiplexed signal may be provided in a narrow beam associated with another subscriber unit at a second time.

The relative power of all codes may be evaluated by each subscriber system, preferably for providing information with respect thereto to a centralized system such as a BTS or other access point. The centralized system may determine the "compatible" groups of subscriber systems based upon the relative power of the codes. For example, the less power reported with respect to a code used in a beam associated with another subscriber system indicates better isolation between the beams of these two subscriber systems. Conversely, the more power reported with respect to a code used in a beam associated with another subscriber system indicates poorer isolation between the beams of these two subscriber systems.

According to a preferred embodiment, the aforementioned probing technique may use native signaling, such as power control (PC) signaling, to probe the channel in order to determine the ability to simultaneously service multiple subscribers. For example, signaling transmitted from an HDR BTS instructing a subscriber system to adjust the subscriber system's transmit power control, e.g., RPC symbols, may be utilized as a channel probing signal of the present invention.

Figure 5:
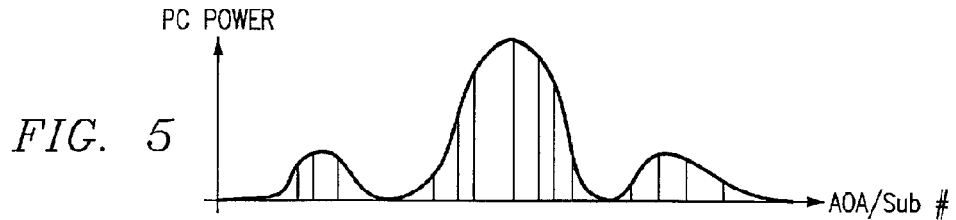
FIG. 5 shows a probing signal reception pattern where negligible multipath is present.
Figure 6:
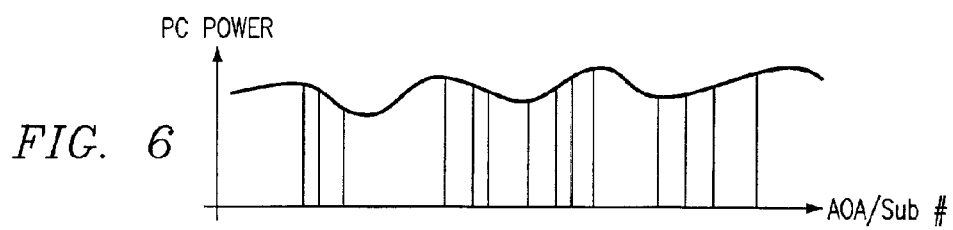
FIG. 6 shows a probing signal reception pattern where severe multipath is present.

Given that each subscriber system's AOA is continuously determined as part of reverse link operation according to a preferred embodiment of the present invention, PC signals can be individually beam-formed to each subscriber system. This operation provides for spatial selectivity of the multiple PC signals at the subscriber systems and, therefore, allows for effective probing of the forward link beams' isolation effectiveness. For example, if the subscribers are uniformly distributed within the cell and multipath is negligible, the PC power values pattern (PC pattern) as measured by single mobile unit would be expected to substantially take the shape of the beam used, as represented in the graph of FIG. 5. In contrast, if strong multipath exists from all over the cell, the PC pattern would be expected to be quite uniform as shown in FIG. 6, indicating that the narrow beam is not effective in isolating the subscriber systems.

In typical operation, each subscriber system measures its own PC pattern and from time to time (as it changes) reports to the BTS. Since the PC pattern is a function of multipath, hence shadowing, it is not expected to change rapidly, hence PC pattern reports are not expected to consume much capacity. Accordingly, in operation according to preferred embodiments of the present invention, subscriber systems may monitor PC control signals of other subscriber systems and report information with respect thereto to the BTS. PC patterns reported back to the BTS are preferably used to sort which subscriber systems can be serviced simultaneously. It should be appreciated that, if the same beam configurations are to be used for data transmission as are used for the compatibility probing signal, the PC patterns reported will show the exact amount of isolation between different forward link traffic beams.

Additionally or alternatively, scattering zone boundaries may be utilized in identifying particular subscriber systems for simultaneous service. As discussed above, a way to prevent intra-sector interference when there are multiple beams being formed in a single sector is to identify each individual subscriber system's scattering zone boundary. Once the scattering zone boundaries are found for all subscriber systems in that sector, multiple forward link beams can be formed to transmit data to multiple subscriber systems simultaneously without causing intra-sector interference to each other provided that each beam is pointed to one subscriber system's scattering zone only. A preferred embodiment method for estimating each individual subscriber system's scattering zone in a communication system employing the US standard cdma2000 1xEV protocols is set forth below.

As previously mentioned, pilot signals are preferably transmitted through a wide beam, such as a sector beam, illuminating a plurality of subscriber systems. Probing signals are preferably transmitted through a more narrow beam. In determining scattering zone boundaries according to a preferred embodiment, let $d(n)$ and $p(n)$ be pilot symbols and probing (e.g., RPC) symbol samples respectively. Additionally, let $y(n)=d(n)*conj(p(n))$ and $z(n)=Im(y(n))$, where $conj( )$ is a conjugate function and $Im( )$ is a function of taking the imaginary part of a complex number. Sample correlation between pilot symbols, $d(n)$, and probing symbols, $p(n)$, may preferably be defined as $r(n+1)=a*r(n)+(1-a)*z(n)*z(n+1)$, where a is an aging factor between 0 and 1. It should be appreciated that the sample correlation between the pilot signal and the probing signal, $r(n+1)$, is proportional to the phase variance (phase mismatch) between pilot signals and probing signals and, therefore, may be utilized in determining scattering boundaries according to the present invention.

Additionally or alternatively, direct measurement of the phase difference between the pilot and probing signals may be used according to the present invention. For example, the method described in the above referenced patent application entitled "Methods of Phase Recovery in Cellular Communication Systems," may be used according to the present invention for direct measurement of phase mismatch.

The pilot/probing signal phase difference is a good indicator of each individual subscriber system's scattering zone. Specifically, once the probing signal beam covers the scattering zone (as may be provided for using beam width control discussed above), the pilot/probing signal phase difference is expected to be negligible, thus indicating the scattering zone boundary.

In operation, the beam width of the probing signal beam can be controlled by the adaptive antenna array. The pilot signal strength, forward link frame error rate, and the pilot/probing signal phase difference can then be used to determine the content in the data rate control (DRC) channel to be sent in the reverse link to the adaptive antenna array base station. In other words, data rate control of the preferred embodiment of the present invention is a function of pilot signal strength, forward link frame error rate, and the pilot/probing signal phase difference. This is different from the current cdma 2000 1xEV standard which uses mainly the pilot signal strength and forward link frame error rate information.

A preferred embodiment relationship between data rate control and pilot signal strength, forward link frame error rate, and phase mismatch is set forth below.

DRCV'=f(DRCV, pilot/probing signal phase difference)

In the above relationship, DRCV' is the new DRC value, and DRCV is the standard DRC value generated from the pilot signal strength and forward link frame error rate information. DRCV can be easily determined by transmitting the pilot signals through the same sector wide beam that also transmits the pilot signals. The function f( ) is preferably a look up table function, such as may be determined using empirical measurements and/or simulations with respect to the data rates which may be reliably maintained with particular phase mismatch, pilot signal strength, and forward link frame error rate.

In general the higher the pilot/probing signal phase difference, the lower will be the DRC value (DRCV'). According to the preferred embodiment, DRCV' will be equal to or less than DRCV. When DRCV' equals DRCV, the scattering zone is fully covered by the probing signal beam (no pilot/probing signal phase difference). Hence, the narrowest probing signal beam which gives DRCV'=DRCV provides the boundary of the subscriber system's scattering zone. Once the scattering zone is covered by the probing signal beam, further increases in the probing signal beam width will not increase the DRCV'.

As discussed above, if a common pilot is to be used for coherent demodulation, the traffic signal or data beam must be wide enough to assure sufficient identity between the common pilot and the data channels. If the two channels are not sufficiently similar, there might be a phase difference between the pilot and the data that prevents use of the pilot as a reference signal for coherent demodulation. Accordingly, a phase mismatch control loop of the present invention will preferably have a decision threshold that can be adjusted based on modulation order and other conditions. This approach may be utilized to assure that forward link beam width will have sufficient margin to accommodate for any expected pilot/data phase mismatch.

It should be appreciated, however, that embodiments of the present invention may implement demodulation techniques in the alternative to use of the above mentioned dedicated pilot. For example, as discussed above, the current HDR standard uses code multiplexing to send RPC signals to all subscribers. These RPC signals, or other signals unique to the subscriber units, may be utilized according to the present invention as a dedicated pilot for use in demodulation in place of the aforementioned common pilot signals.

According to the HDR standard, there are 256 chips per slot for one RPC bit (24 dB despreading gain). Since there are 64 codes, the relative average power per chip relative to data is 1/64 (~18 dB). The highest spreading factor for data is 32 (15 dB gain). The HDR physical layer allows for changing the relative power on different codes such that RPC signal power can be unevenly allocated. This fact allows increasing the power for RPC signals associated with lower C/I at the subscriber station.

To correctly demodulate PC information, standard HDR requires the RPC signal to be at approximately 3 dB C/I (BPSK). For the lowest pilot C/I value (−9.5 dB), the PC signal is at 18 dB lower C/I (−9.5−18=−27.5 dB). Despreading gain is 24 dB (setting PC C/I to −3.5 dB), hence standard HDR must increase the power to lowest C/I subscriber systems by 6.5 dB. Since beam forming increases C/I by 5 dB, there is a substantial RPC C/I surplus at the majority of the subscriber systems.

The table below shows how adding gain (using narrow antenna beams according to the present invention) allows for use of power control signal as a dedicated pilot.

power, i.e., 0.75 W, is provided (it being appreciated that a power savings of less than the illustrative 75% may be experienced in systems wherein the RPC signal power levels associated with particular subscriber systems, such as those having a relatively high Doppler rate, as discussed above). This saved power, or some portion thereof, may be used to increase the RPC powers of subscriber systems having data transmitted in the forward link, e.g., 3 subscriber systems determined to be compatible for simultaneous data transmission according to the present invention. It should be appreciated that this preferred embodiment coherent demodulation does not increase the radiated energy level as the effective radiated power (ERP) of the RPC signals of the 3 illustrative subscriber systems is 0.75 W/3*array gain (4)=1 W, which is equivalent to the common pilot's ERP.

Having made determinations with respect to groups of compatible subscriber systems, preferably utilizing the aforementioned scattering zone and/or probing determinations, transmissions with respect to subscriber systems are preferably scheduled to maximize data throughput. A flow diagram of a preferred embodiment scheduling process of the present invention is shown in FIG. 7.

Figure 7:
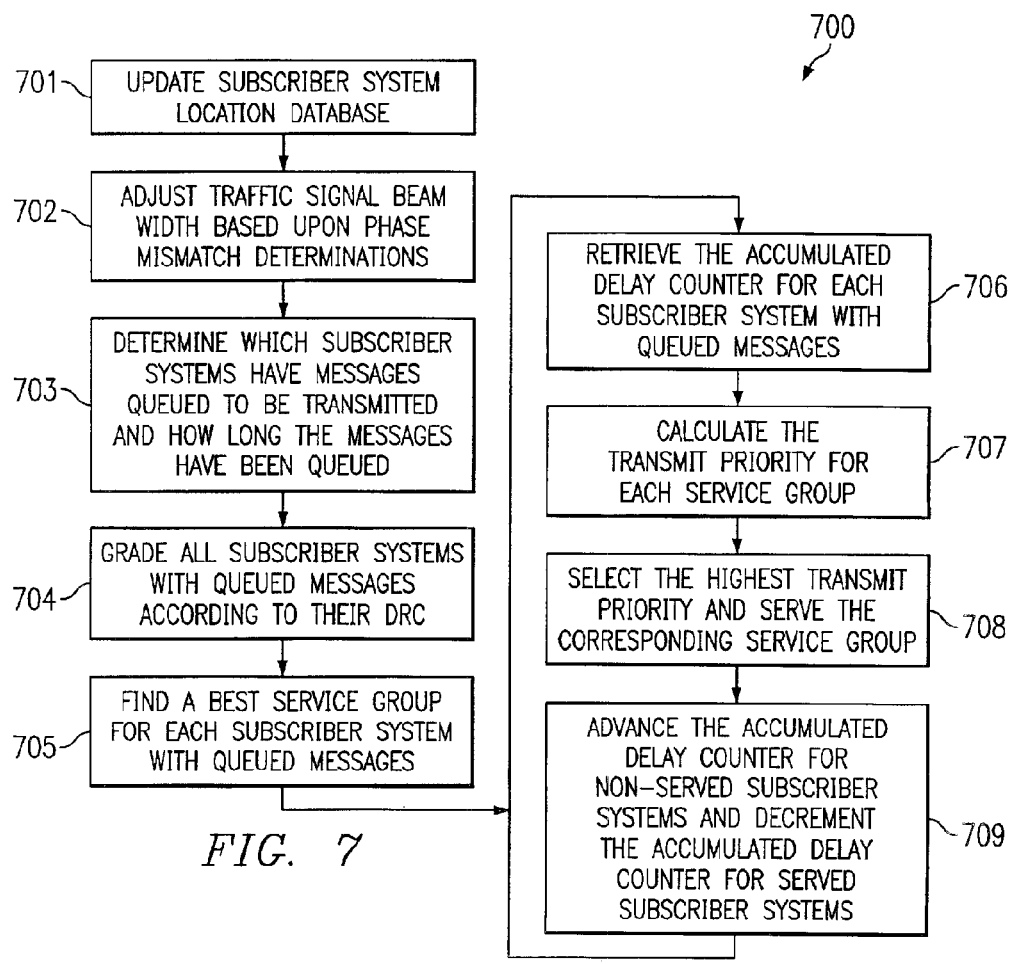
FIG. 7 shows a preferred embodiment scheduling algorithm of the present invention.

Scheduling process 700 of FIG. 7 begins with the update of a subscriber system location database (box 701). For example, AOA information as determined from ARVs associated with the various subscriber systems may be utilized to

TABLE 3-1

Power control power allocation chart

| Rate | C/I(dB) | PC(dB) | DG(dB) | C/I after ds. with array G | PC Power relative change | # of subs | # out of 29 | Power charge | PC Power | PC Inc. |
|---|---|---|---|---|---|---|---|---|---|---|
| 76.8 | −9.5 | −24.5 | 21 | 1.5 | 1.5 | 1 | 1 | 0.01 | 0.05 | 0.29 |
| 102.6 | −8.5 | −23.5 | 21 | 2.5 | 0.5 | 4 | 1 | 0.00 | 0.04 | 0.23 |
| 153.6 | −6.5 | 021.5 | 21 | 4.5 | −1.5 | 8 | 2 | −0.02 | 0.05 | 0.15 |
| 204.8 | −5.7 | −20.7 | 21 | 5.3 | −2.3 | 15 | 4 | −0.06 | 0.08 | 0.12 |
| 307.2 | −4 | −19 | 21 | 7 | −4 | 24 | 7 | −0.15 | 0.10 | 0.08 |
| 614.4 | −1 | −16 | 21 | 10 | −7 | 18 | 5 | −0.14 | 0.03 | 0.04 |
| 921.6 | 1.3 | −13.7 | 21 | 12.3 | −9.3 | 11 | 3 | −0.09 | 0.01 | 0.02 |
| 1228.8 | 3 | −12 | 21 | 14 | −11 | 10 | 3 | −0.10 | 0.01 | 0.02 |
| 1843.2 | 7.2 | −7.8 | 21 | 18.2 | −15.2 | 5 | 2 | −0.07 | 0.00 | 0.01 |
| 2457.6 | 9.5 | −5.5 | 21 | 20.5 | −17.5 | 4 | 1 | −0.03 | 0.00 | 0.00 |

In the above table, the C/I after de-spreading and array gain column ("C/I after ds. With array G") shows the expected power control C/I at subscriber systems that have the given C/I for data and common pilot. The power control increase column ("PC inc.") shows the required power increase for each subscriber system when data is transmitted to it.

From the above table, it can be seen that subscriber systems may be serviced using the power control signal as a demodulating reference (dedicated pilot) without adding more power to the power control total power. It is assumed that 10 dB C/I is sufficient for QPSK demodulating reference. For higher modulation ranks, the table shows that very little added power is required since very little PC power is necessary.

To better illustrate that there is enough power in HDR RPC signals for coherent demodulation according to this embodiment of the present invention, assume that the current system guarantees sufficient RPC power for acceptable BPSK demodulation, and has a total transmitting power of 1 W. Further assume that, on average, 6 dB of array beam forming gain is provided when narrow beam forming according to the present invention is applied to the RPC signals. That would mean that a savings of 75% of the total indicate the direction of each subscriber system in a subscriber system location database. Additionally, the aforementioned spreading zone information, phase mismatch information, and/or probing information may be +provided in the subscriber system location database.

The traffic signal or data beam width for each subscriber system is preferably established based on phase mismatch determinations as discussed above (box 702). For example, the subscriber system location database may include phase mismatch information stored therein for identifying a traffic signal beam configuration for use according to the present invention.

Preferably, a determination is made as to which subscriber systems have messages waiting for transmission (box 703). Moreover, preferred embodiments further determine how long the messages have already been waiting. For example, a message queue for each subscriber system may be analyzed to determine those subscriber systems having messages queued for transmission and the length of time each such message has been in the queue or an accumulated delay associated with the subscriber's messages. This information may be utilized, for example, in ensuring a minimum quality of service and/or for weighting transmission decisions with respect to a subscriber for which messages have experienced a relatively long delay.

Subscriber systems with messages waiting for transmission are preferably graded, or otherwise ranked, according to their received data rate control information (box 704). For example, data rate control information provided by a subscriber system as a function of the forward link channel characteristics may be utilized to grade each subscriber system having messages waiting for transmission according to the rate at which data may be transmitted to each respective subscriber system. Such grading information may be utilized in weighting transmission decisions with respect to a subscriber for which a relatively high data rate may be maintained.

A best "service group" for each subscriber system with messages waiting for transmission is preferably found (box 705). According to a preferred embodiment, a best service group with respect to a particular subscriber system is that group of subscriber systems which can be simultaneously served that provides a maximum aggregate data rate. For example, the aforementioned grading information may be utilized to identify subscriber systems in a best service group, wherein groups are formed of compatible subscriber systems having highest grades. Preferred embodiments of the present invention check all possible subscriber system combinations that can be simultaneously served with a selected subscriber. The combination of subscriber systems with the highest aggregate data rate value, or combination of highest graded or ranked subscriber systems, is preferably selected as the best service group with respect to the selected subscriber.

An accumulated delay counter value for each subscriber system is preferably retrieved (box 706). This accumulated delay counter may indicate the number of scheduling cycles of the present invention a message has been waiting for transmission and, therefore, may be utilized to weight determinations with respect to scheduling transmission. For example, the accumulated delay counter may be incremented each slot that service is not provided and decremented when service is given. Moreover, a maximum latency threshold may be defined such that when the accumulated delay counter reaches the latency threshold value, service is forced.

Preferably, a "transmit priority" for each best service group is calculated (box 707). For example, for each service group identified as a best service group with respect to a subscriber system with messages waiting for transmission, a transmit priority is preferably calculated as a function of the aggregate accumulated delay counter and aggregate data rate associated with the subscriber systems of the service group.

The highest value of transmit priority is preferably identified and the service group corresponding thereto is preferably selected to be served during a next service epoch (box 708). It should be appreciated that the use of the transmit priority of the preferred embodiment provides for maximized throughput by weighting the selection of a service group based upon the data rate achievable with each particular group. Moreover, the preferred embodiment operates to hold communication latency to an acceptable level through weighting the selection of a service group based upon the accumulated delay associated with queued messages. Particular embodiments of the present invention may operate to force selection of a particular service group when the accumulated delay counter associated with a particular subscriber system reaches a threshold value and, thereby, ensure that no single subscriber system experiences excessive latency.

The accumulated delay counters associated with subscriber systems with messages waiting for transmission are preferably updated to reflect another service epoch (box 709). For example, subscriber systems for which service was provided in the service epoch (subscriber systems of the selected service group) preferably have their associated accumulated delay counter decremented. Similarly, subscriber systems for which service was not provided in the service epoch (subscriber systems not in the selected service group) preferably have their associated accumulated delay counter incremented.

Upon completion of a service epoch, steps of the preferred embodiment service process are preferably repeated to serve additional subscriber systems in subsequent service epochs. For example, the illustrated embodiment returns to box 706 for further processing to determine the accumulated delay counter for subscriber systems and calculate transmit priority for the service groups. Of course, the process may return to different points in the process, if desired. For example, as new messages are added to the queues, processing may return to box 703 to determine which subscriber systems have messages waiting for transmission and regrouping of subscriber systems. Similarly, as subscriber systems move within the area, processing may return to box 701 for determination of the subscriber system location information.

According to a preferred embodiment, the above scheduling process is provided as two main parallel subprocesses. Specifically, according to this embodiment, a continuous determination of beam parameters with respect to the subscriber systems is made, i.e., boxes 701 and 702. In parallel with the beam parameter determinations, this embodiment of the invention schedules transmission to the subscriber stations according to beam parameters and channel quality, i.e., boxes 703–709.

It should be appreciated that the above described preferred embodiment process adds spatial conditions as service factor, e.g., subscriber systems spatially separated sufficiently to allow highest data rates and/or a greatest number of simultaneously served subscriber systems are give preference in the service selection process. Accordingly, in addition to increasing the system throughput by establishing parallel transmissions, preferred embodiments of the present invention provide "spatial diversity" such that, at each instant, the best spatial and channel loss conditions are selected.

It should be appreciated that preferred embodiments of the present invention may be implemented using instruction sets operable upon processor based systems to provide the features and functions described herein. For example, a general purpose processor based system, such as a personal computer system having a central processor (e.g., a processor of the INTEL PENTIUM processor platform), memory (e.g., RAM, ROM, magnetic media, optical media, and the like), and input/output capabilities (e.g., serial data input/output, parallel data input/output, user display device, user input device, and the like) may be programmed to systems of a BTS to provide beam forming, probing signal transmission, channel analysis, service group selection, and the like as described above. Of course, additional or alternative circuitry may be utilized according to the present invention. For example, Application Specific Integrated Circuits (ASIC) may be utilized in providing one or more of the aspects of the present invention. Additionally or alternatively, systems such as subscriber units and/or BTS controllers may be adapted, such as through software and/or firmware revisions and/or through addition or alternation of hardware components, to provide aspects of the present invention.

Although the present invention and its advantages have been described in detail, it should be understood that various changes, substitutions and alterations can be made herein without departing from the spirit and scope of the invention as defined by the appended claims. For example, although the present invention has been described with respect to calibration in a forward link (central system to subscriber premises), it should be appreciated that reverse link calibration (subscriber premises to central system) and/or pier to pier link calibration (central system to central system or subscriber premises to subscriber premises) calibration may be provided according to the present invention. Accordingly, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or late to be developed that perform substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining a scattering zone associated with a communication unit, said method comprising:
   transmitting a reference signal using a first beam configuration;
   transmitting a probing signal using a second beam configuration;
   estimating a phase difference between said reference signal and said probing signal as received at said communication unit; and
   estimating said scattering zone using information with respect to said phase difference estimation.

2. The method of claim 1, further comprising:
   altering at least one of said first and second beam configurations and repeating said transmitting said reference and probing signals and said estimating said phase difference.

3. The method of claim 2, wherein said estimating said scattering zone comprises:
   determining a beam configuration providing a least phase difference.

4. The method of claim 3, wherein said determining a beam configuration providing a least phase difference comprises:
   determining a beam configuration providing said least phase difference having a least beam width.

5. The method of claim 1, wherein said first beam configuration provides a wider beam than said second beam configuration.

6. The method of claim 5, wherein said first beam configuration provides a substantially omni-directional beam.

7. The method of claim 5, wherein said first beam configuration provides a sector beam configuration.

8. The method of claim 1, wherein said reference signal comprises a pilot signal.

9. The method of claim 1, wherein said probing signal comprises a system native data stream.

10. The method of claim 9, wherein said system native data stream comprises a reverse link transmit power control signal.

11. The method of claim 9, wherein said probing signal is utilized as a dedicated pilot by said communication unit.

12. The method of claim 11, further comprising:
    increasing a relative power associated with the probing signal as transmitted in the second beam configuration, for use of the probing signal as a dedicated pilot, over that of a wide beam transmission of the probing signal.

13. The method of claim 1, wherein said estimating said phase difference comprises:
    correlating said reference and probing signals as received at said communication unit.

14. The method of claim 1, further comprising:
    estimating a highest data rate for use with said communication unit as a function of said phase difference estimate.

15. The method of claim 1, further comprising:
    transmitting a probing signal using a third beam configuration;
    estimating a second phase difference between said reference signal and said probing signal transmitted using said third beam configuration as received at a second communication unit; and
    estimating a scattering zone with respect to said second communication unit using information with respect to said second phase difference.

16. The method of claim 15, further comprising:
    determining two or more communication units of a plurality of communication units for simultaneous communication as a function of corresponding scattering zone estimates, wherein said plurality of communication units includes said communication unit and said second communication unit.

17. The method of claim 16, further comprising:
    scheduling communications with respect to said two or more communication units as a function of a highest aggregate data rate associated with groups of said two or more communication units determined to be compatible for said simultaneous communications.

18. A system for determining a scattering zone associated with a communication unit, said system comprising:
    means for transmitting a reference signal using a first beam configuration;
    means for transmitting a probing signal using a second beam configuration;
    means for estimating a phase difference between said reference signal and said probing signal as received at said communication unit; and
    means for estimating said scattering zone using information with respect to said phase difference estimation.

19. The system of claim 18, further comprising:
    means for altering said second beam configuration;
    means for repeating said transmitting said probing signal using said altered beam configuration; and
    means for repeating estimating said phase difference.

20. The system of claim 19, wherein said means for estimating said scattering zone comprises:
    means for determining a beam configuration providing a least phase difference.

21. The system of claim 20, wherein said means for determining a beam configuration providing a least phase difference comprises:
    means for determining a beam configuration providing said least phase difference having a least beam width.

22. The system of claim 18, wherein said first beam configuration provides a wider beam than said second beam configuration.

23. The system of claim 22, wherein said first beam configuration provides a substantially omni-directional beam.

24. The system of claim 22, wherein said first beam configuration provides a sector beam configuration.

25. The system of claim 18, wherein said reference signal comprises a pilot signal.

26. The system of claim 18, wherein said probing signal comprises a system native data stream.

27. The system of claim 26, wherein said system native data stream comprises a reverse link transmit power control signal.

28. The system of claim 26, further comprising:
means for using said probing signal as a dedicated pilot by said communication unit.

29. The system of claim 28, wherein said means for using said probing signal as a dedicated pilot comprises:
means for increasing a relative power associated with the probing signal as transmitted in the second beam configuration over that of a wide beam transmission of the probing signal.

30. The system of claim 18, wherein said means for estimating said phase difference comprises:
means for correlating said reference and probing signals as received at said communication unit.

31. The system of claim 18, further comprising:
means for estimating a highest data rate for use with said communication unit as a function of said phase difference estimate.

32. The system of claim 18, further comprising:
means for transmitting a second probing signal using a second beam configuration;
means for estimating a phase difference between said reference signal and said second probing signal as received at a second communication unit; and
means for estimating a second scattering zone using information with respect to said second phase difference estimation.

33. The system of claim 32, further comprising:
means for determining two or more communication units of a plurality of communication units for simultaneous communication as a function of corresponding scattering zone estimates, wherein said plurality of communication units includes said communication unit and said second communication unit.

34. The system of claim 33, further comprising:
means for scheduling communications with respect to said two or more communication units as a function of a highest aggregate data rate associated with groups of said two or more communication units determined to be compatible for said simultaneous communications.

35. A system for providing simultaneous communication links without unacceptable interference therebetween, said system comprising:
an antenna array having a plurality of antenna elements;
a scattering zone estimator coupled to said antenna array, wherein said scattering zone estimator determines scattering zone information with respect to communication units of a plurality of communication units; and
a beam former coupled to said antenna array, wherein said beam former provides beam forming for simultaneous communication of a signal associated with a first communication unit of said plurality of communication units and a signal associated with a second communication unit of said plurality of communication units, wherein said beam forming includes forming a first beam associated with said first communication unit as a function of corresponding said scattering zone information and a second beam associated with said second communication unit as a function of corresponding said scattering zone information.

36. The system of claim 35, wherein said scattering zone estimator comprises:
a control algorithm operable upon a processor based system controlling operational aspects of a wireless communication station.

37. The system of claim 36, wherein said operational aspects of said wireless communication station include controlling said beam former to form said first beam for transmission of a first probing signal associated with said first communication unit, and wherein said scattering zone estimator determines said scattering zone information associated with said first communication unit as a function of a phase difference between said first probing signal as transmitted in said first beam and a reference signal as transmitted in a third beam.

38. The system of claim 37, wherein said first beam provides a more narrow beam configuration than said second beam.

39. The system of claim 37, wherein said first probing signal comprises a system native signal.

40. The system of claim 39, wherein said system native signal comprises a reverse link power control data stream associated with said first communication unit.

41. The system of claim 37, wherein said first probing signal is utilized as a dedicated pilot for said first communication unit with respect to data transmitted using said first beam.

42. The system of claim 37, wherein said operational aspects of said wireless communication station include controlling said beam former to form said second beam for transmission of a second probing signal associated with second communication unit, and wherein said scattering zone estimator determines said scattering zone information associated with said second communication unit as a function of a phase difference between said second probing signal as transmitted in said second beam and a reference signal as transmitted in a third beam.

43. The system of claim 37, wherein said operational aspects of said wireless communication station include controlling said beam former to form a plurality of beams for transmission of said first probing signal, wherein said plurality of beams includes said first beam and at least a beam having a more narrow configuration than said first beam, and wherein said scattering zone estimator further determines said scattering zone information associated with said first communication unit as a function of a phase difference between said first probing signal as transmitted in said beam having a more narrow configuration and said reference signal as transmitted in said third beam.

44. The system of claim 35, further comprising:
a direction estimator coupled to said antenna array, wherein said direction estimator determines an estimate of direction of communication units of said plurality of communication units with respect to said antenna array, wherein said first beam is further formed as a function of said direction estimation associated with said first communication unit and said second beam is further formed as a function of said direction estimation associated with said second communication unit.

45. A system for providing simultaneous wireless communications with respect to a plurality of communication units, said system comprising:

an antenna array having a plurality of antenna elements;

and array response vector estimator coupled to said antenna array, wherein said array response vector estimator accepts a plurality of signals associated with said plurality of antenna elements and provides array response vector information with respect to a response of said antenna array for a first communication unit of said plurality of communication units and for a second communication unit of said plurality of communication units;

a direction estimator coupled to said array response vector estimator, wherein said direction estimator utilizes said array response vector information to estimate a direction of said first communication unit with respect to said antenna array and a direction of said second communication unit with respect to said antenna array;

a scattering zone estimator coupled to said antenna array, wherein said scattering zone estimator provides scattering zone information with respect to a scattering zone associated with said first communication unit and a scattering zone associated with said second communication unit; and a beam former coupled to said antenna array, wherein said beam former provides beam forming for communication of a first payload signal associated with said first communication unit as a function of said direction estimation and said scattering zone information and for communication of a second payload signal associated with said second communication unit as a function of said direction estimation and said scattering zone information.

46. The system of claim 45, wherein said scattering zone estimator utilizes a plurality of different beam configurations with respect to said first and second communication units to determine a beam configuration associated with said first communication unit indicative of said scattering zone associated with said first communication unit and to determine a beam configuration associated with said second communication unit indicative of said scattering zone associated with said second communication unit.

47. The system of claim 45, wherein said scattering zone information is determined as a function of a first unique data signal associated with said first communication unit transmitted in a first beam configuration, a second unique data signal associated with said second communication unit transmitted in a second beam configuration, and a common signal transmitted using a common beam configuration.

48. The system of claim 47, wherein said first unique data signal comprises a first native data stream associated with said first communication unit, and wherein said second unique data signal comprises a second native data stream associated with said second communication unit.

49. The system of claim 48, wherein said first and second native data streams comprise a reverse link power control signal.

50. The system of claim 48, wherein said first unique data signal as transmitted in said first beam configuration is utilized as a dedicated pilot for demodulation of said first payload signal, and wherein said second unique data signal as transmitted in said first beam configuration is utilized as a dedicated pilot for demodulation of said second payload signal.

* * * * *

UNITED STATES PATENT AND TRADEMARK OFFICE
CERTIFICATE OF CORRECTION

PATENT NO. : 6,895,258 B1 Page 1 of 1
APPLICATION NO. : 09/929866
DATED : May 17, 2005
INVENTOR(S) : Shimon B. Scherzer et al.

It is certified that error appears in the above-identified patent and that said Letters Patent is hereby corrected as shown below:

On the Cover Page:

On the cover page, located in the Related U.S. Application Data (left hand column), delete the portion of text reading "Provisional application No. 60/242,267 filed on Oct. 19, 2000" and replace with --Provisional application No. 60/242,467 filed on Oct. 23, 2000--.

In the Specification:

Column 1, Line 11 delete the portion of text reading "Ser. No. 60/242,267" and replace with --Ser. No. 60/242,467--.

Column 1, Line 12 delete the portion of text reading "filed Oct. 19, 2000" and replace with --filed Oct. 23, 2000--.

Column 1, Line 24 delete the portion of text reading "Ser. No. 09/929,638" and replace with --Ser. No. 08/929,638--.

Signed and Sealed this

Twelfth Day of August, 2008

JON W. DUDAS
*Director of the United States Patent and Trademark Office*